Figure 1:
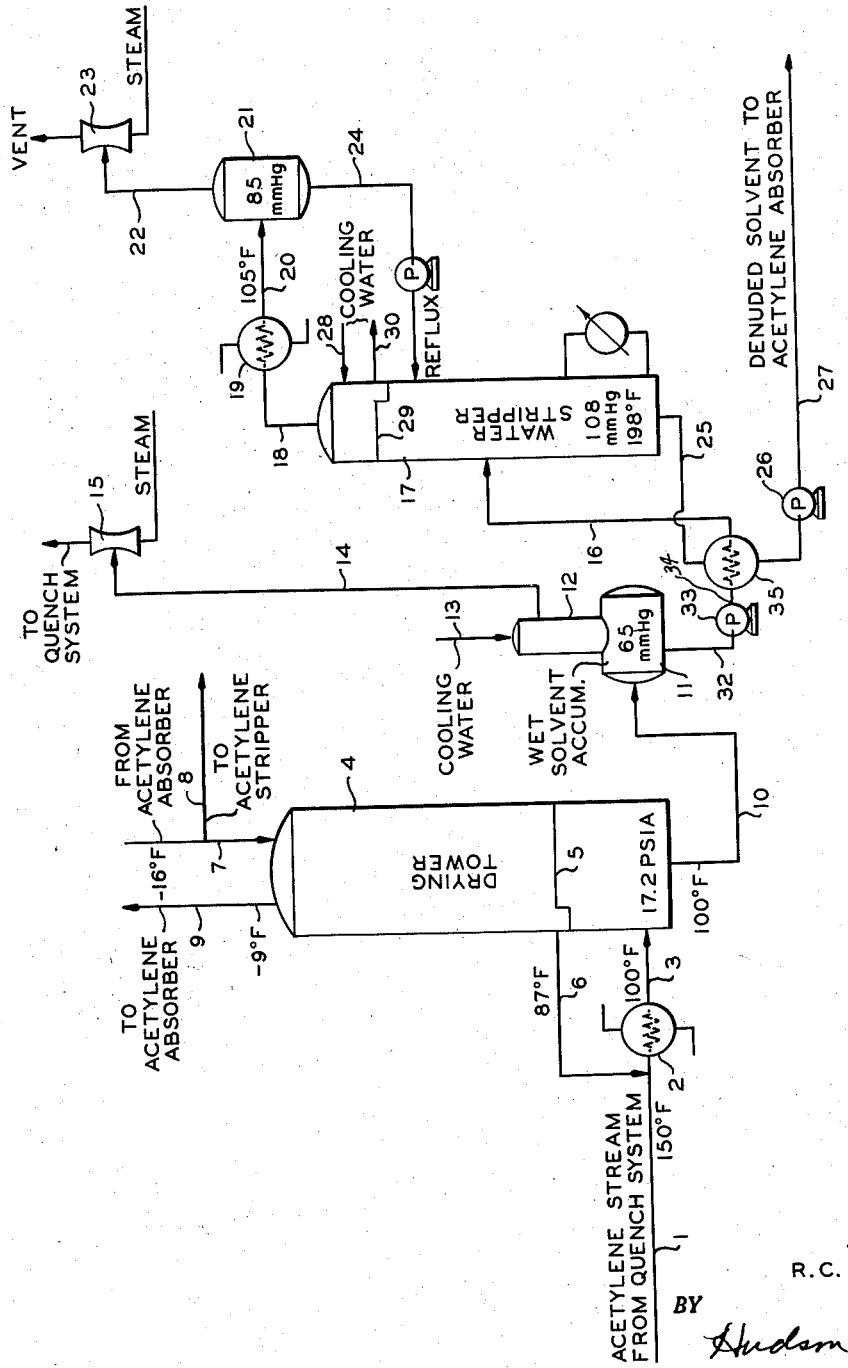

INVENTOR.
R.C. SCOFIELD

INVENTOR.
R. C. SCOFIELD

United States Patent Office 2,871,979
Patented Feb. 3, 1959

2,871,979

DEHYDRATION OF GASES CONTAINING ACETYLENE AND REMOVAL OF ACETYLENE THEREFROM

Raymond C. Scofield, Bartlesville, Okla., assignor to Phillips Petroleum Company, a corporation of Delaware Application June 23, 1955, Serial No. 517,495

15 Claims. (Cl. 183—115)

This invention relates to the dehydration of hydrocarbon gases. In one of its aspects the invention relates to the removal of water from a gas containing hydrocarbons including acetylene employing dimethylformamide as a selective dehydrating solvent. In another of its aspects, the invention relates to several advantageous modus operandi for the dehydration of a gas containing hydrocarbons including acetylene and the removal of acetylene from the dehydrated gases obtained employing dimethylformamide in said dehydration and acetylene removal steps. Other aspects of the invention are apparent from a perusal of this disclosure, the drawings and the appended claims.

The removal of water from gases such as cracked hydrocarbon gases prior to removal of acetylene therefrom at low temperatures presents a problem when such dehydrating solvents or agents as glycols are employed. Indeed, the drying of the gases is never as complete as can be obtained with bauxite or silica gel from which, of course, the economical recovery of the hydrocarbons which would become absorbed would present still further problems. Glycols are disadvantageous principally because of their high viscosities, about 40 centipoises at 75° F. This indication is found also in the art.

Drying by means of a silica gel or bauxite is disadvantageous because a cyclic operation is required. Even more serious is the problem of the persistent hydrocarbon fog produced in the acetylene-forming reaction. This fog deposits as a tar on the silica gel or bauxite, interfering with drying and in some instances causing plugging. As a result these desiccants must be replaced frequently.

Thus it is clear that a dehydrating solvent, especially adapted for the dehydration of hydrocarbon-containing gases, including acetylene, has remained to be found.

It is an object of this invention to provide a method for the dehydration of gases containing hydrocarbons including acetylene.

It is another object of this invention to provide a method for the removal of water from hydrocarbon gases containing acetylene following which the dehydrated gases are treated to remove acetylene therefrom.

Other objects, as well as the several advantages of this invention, are apparent from a study of this disclosure, the drawings and the appended claims.

According to this invention it has been found that dimethylformamide is ideally suited to drying operations for producing exceptionally low dew points or quantitative removal of water from gases containing hydrocarbons including acetylene. Thus, according to the invention, such a gas is contacted with dimethylformamide under conditions such that after a desired contacting the dimethylformamide will contain sufficient water to avoid dissolving into or retaining in the dimethylformamide undesired quantities of the said hydrocarbons especially acetylene. Also according to the invention there are provided modus operandi in which dimethylformamide is employed first to dehydrate a gas following which it is employed to remove acetylene therefrom. In one embodiment of the invention which is now preferred, the dimethylformamide solvent is employed at a low temperature of the order of 0° F. or below to effect dehydration. Thus, it has been found that an equimolar mixture of dimethylformamide and water has a freezing point of approximately —68° F. and that such a mixture at said low temperature will be effective to dehydrate a hydrocarbon-containing gas, especially a gas also containing acetylene and/or ethylene.

It is a feature of the present invention that the dimethylformamide is contacted with the gases until its water content, taking into account the proportion of solvent to the gas employed, is sufficiently high to prevent removal from the dehydration zone dissolved in the solvent any substantial or undesirably high proportion of said gases, especially acetylene and/or ethylene.

Figure 2:
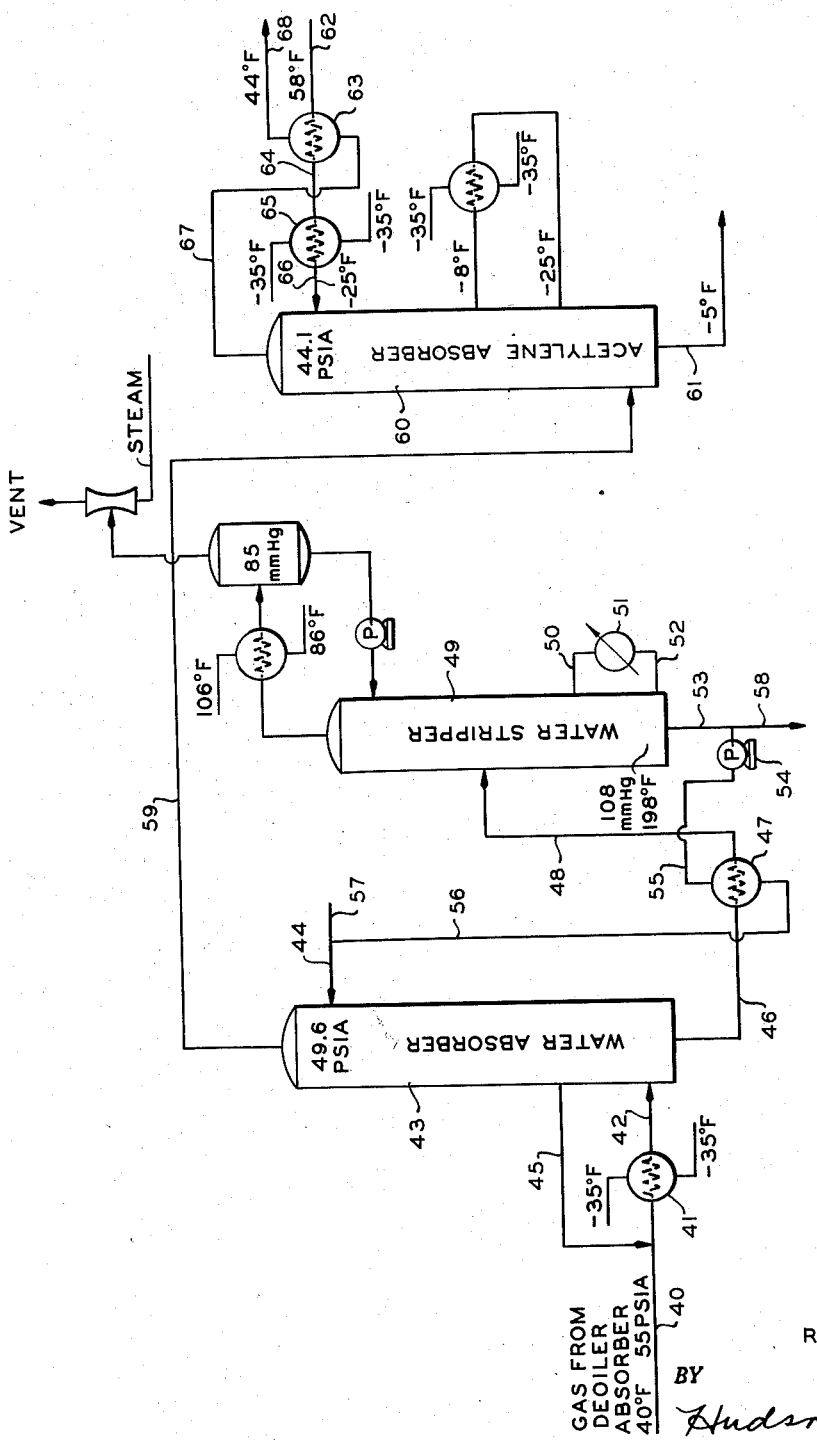

The drawings illustrate in simplified manner flow plans of embodiments of the present invention. Only sufficient pieces of various types of equipment such as vessels, pipes, pumps, exchangers and valves, have been shown to permit a ready understanding of the several embodiments and how these may be varied by one skilled in the art having studied this disclosure, drawing and claims. Figure 1 shows the flow plan of a drying operation in which an acetylene-rich dimethylformamide, which can be from an acetylene absorber in which it has been used to absorb acetylene from gases containing the same, in this case a gas also containing ethylene, is contacted with a gas containing acetylene and ethylene and water under conditions and in a manner to remove therefrom substantially all of the water. It will be noted that in this embodiment the dimethylformamide serves the dual function of drying the gases and removing acetylene therefrom. Figure 2 shows an embodiment in which the dimethylformamide in the water removal zone or absorber is not used directly from an acetylene absorption and does not contain acetylene. Thus, as later described, the dimethylformamide in the embodiment of Figure 2 is contacted with the gas stream containing acetylene, ethylene and other gases, later identified, under conditions and in a manner to remove substantially only water therefrom.

Referring now to Figure 1, a gas containing acetylene, and generally having the compositions shown in column 1 of Table I, obtained from a quench system at a temperature of approximately 150° F. is passed by way of pipe 1, cooler 2, and pipe 3 into drying tower 4. Preferably, as a modification, a portion of dimethylformamide solvent is cooled and removed from tray 5 and passed by way of pipe 6 into admixture with the gas in pipe 1. This premixing of dimethylformamide solvent with gas stream in pipe 1 followed by heat exchange is considered a feature of the process, the efficiency of which is considerably improved thereby. Drying tower 4 is constructed in any desired manner and preferably contains contact surface supplying materials such as baffles, rings, beads, etc., to cause intimate contact of the gases fed thereto with acetylene-rich dimethylformamide fed thereto by way of pipe 7. In this example, the acetylene-rich dimethylformamide solvent contains substantially no water (see Table I, column 8) but does contain appreciable quantities of other gases, notably carbon dioxide, vinyl acetylene, and other gases as noted in Table I. The temperature of this stream is maintained at about $-20°$ F. The proportion of the acetylene-rich solvent fed to tower 4 is determined mainly by the amount of water in feed stream 1 since the acetylene-rich stream is essentially a dry one. It will be noted from columns 8 and 9 of Table I that a total of 97,482 mols per stream day of acetylene-rich solvent are removed from the acetylene absorber (not shown) and that of this amount of solvent, only 22,843 mols per stream day are passed into absorber 4, the remainder being passed directly by way of pipe 8 to an acetylene stripper also not shown. Upon contact in the absorber with the acetylene-containing stream fed thereto by way of pipe 3, the acetylene-rich solvent removes substantially all of the water originally contained in said acetylene-containing stream so that there is taken off overhead from the absorber 4 by way of pipe 9 a gas stream containing no appreciable amount of water but containing substantially all of its other components. Indeed, comparison of the acetylene values in columns 1 and 7 of Table I will show an increase of the acetylene in the gas in pipe 9 over the acetylene in the gas in pipe 3. The solvent removed from absorber 4 by way of pipe 10 contains substantially all of the water entering absorber 4 by way of pipe 3 and about 100 mols per stream day of acetylene (amounting to 0.37 mol percent of the solvent) as well as other gases as evident from column 3 of Table I. This stream which is at approximately 100° F., enters wet solvent accumulator 11 which is provided with a packed tower 12 to which there is fed by way of pipe 13 a quantity of cooling water sufficient to scrub out traces of dimethylformamide which may be entrained with gases passing from accumulator 11, and tower 12, by way of pipe 14 and steam jet 15 to the quench system. It is noted that the acetylene and ethylene and other gases which leave by way of pipe 14 are returned to the system and are, therefore, not lost. In absorber 4, a pressure slightly above atmospheric, in this embodiment 17.2 pounds per square inch absolute, is maintained. However, the pressure in wet solvent accumulator 11 is quite low and is of the order of 65 mm. of mercury. Liquid from wet solvent accumulator 11 is withdrawn by pipe 32 and pumped by pump 33, pipe 34 by way of heat exchanger 35, and pipe 16 into water stripper 17. In stripper 17, water is stripped from the solvent taken overhead by way of pipe 18, cooler 19, pipe 20 and reflux drum 21 into and out through pipe 22. Pipe 22 is equipped with steam jet 23, the effluent of which is vented. The composition of the overhead from reflux drum 21 is shown in column 5 of Table I. It will be noted that this effluent contains substantially all of the diacetylene and, therefore, it is a feature of the invention as it is practiced in conjunction with an acetylene absorber that no additional diacetylene removal step need be practiced anywhere else in the process.

The temperature in the reflux drum is maintained at approximately 105° F. in this embodiment in which reflux is passed by way of pipe 24 into stripper 17 to regulate the operation therein. Bottoms in the stripper are reboiled and maintained at approximately 198° F., the pressure being about 108 mm. mercury. Under these conditions the bottoms are substantially denuded solvent, dimethylformamide, which is passed by way of pipe 25, heat exchanger 35, pump 26, and pipe 27 to the acetylene absorber which, as noted, is not shown. When desired cooling water can be introduced into direct contact with the overhead leaving the top of stripper 17 and, when introduced, is introduced by way of pipe 28, collected on trays 29 and removed by way of pipe 30.

Referring now to Figure 2 of the drawing, acetylene-containing gas of composition as shown in column 1 of Table II which in this embodiment is a gas from a de-oiling absorber in which higher boiling or oily material is removed from an acetylene-containing gas obtained by cracking of hydrocarbons, is passed by pipe 40, refrigerator 41 and pipe 42 into water absorber 43 wherein it is contacted with cold dimethylformamide (at a temperature below 0° F.) fed to the top of absorber 43 by way of pipe 44. As described in connection with the description of Figure 1, a portion of the solvent is passed by way of pipe 45 into pipe 40 to increase the efficiency of the operation. The gas from the deoiler absorber (not shown) is pumped at a temperature of approximately 40° F. and a pressure of about 55 pounds per square inch absolute into admixture with the solvent fed to pipe 40 by way of pipe 45 and is refrigerated in refrigerator 41 to a temperature of approximately $-25°$ F. which is the temperature at which the foot of water absorber 43 is maintained. Bottoms from absorber 43, which is maintained at approximately 49.6 pounds per square inch absolute, are passed by way of pipe 46, heat exchanger 47, and pipe 48 into water stripper tower 49. Stripper 49 is maintained at sub-atmospheric pressure, the foot of the tower being held at a temperature near 198° F. and corresponding to a pressure of 108 mm. of mercury. The bottom of tower 49 is heated by removing a portion of the bottoms therein by way of pipe 50, reboiler 51 and returning same by way of pipe 52. Bottoms from tower 49 are withdrawn by way of pipe 53 and pumped by way of pump 54, pipe 55, heat exchanger 47, and pipe 56 to pipe 44 for introduction into absorber 43. Make-up dimethylformamide, as desired, can be fed to the system by way of pipe 57. Also, as desired, at least a portion of the solvent can be removed from the system by way of pipe 58 for regeneration or purification purposes. Overhead from absorber 43 is passed by way of pipe 59 into acetylene absorber 60 which is maintained at approximately 44 pounds per square inch absolute. It will be noticed that substantially all of the acetylene contained in the gas fed to absorber 43 is taken off as overhead by way of pipe 59. Please see columns 1 and 2 of Table II. The temperature at the top of acetylene absorber 60 is maintained at approximately $-25°$ F. whereas the bottom of this absorber is maintained at approximately $-5°$ F. Bottoms are removed from absorber 60 by way of pipe 61 and will contain almost all of the acetylene fed to this absorber as can be noted from a comparison of columns 2 and 4 of the table. The bottoms which are withdrawn by way of pipe 61 are stripped of acetylene in an acetylene stripper, not shown, cooled and returned to absorber 60 by way of pipe 62 for reuse and for this purpose are passed by way of heat exchanger 63, pipe 64 and refrigerator 65 into pipe 66 and finally into absorber 60. Overhead from absorber 60 is passed by way of pipe 67 through heat exchanger 63 and pipe 68 to utilization as desired. It will be noted that the gas in pipe 68 contains only a negligible quantity of acetylene, yet contains substantially all of the ethylene originally present, please see columns 1 and 3 of Table II. The internal construction of absorber 43 as will be understood by one skilled in the art in possession of this disclosure is such that the relatively small quantity of dimethylformamide is intimately contacted with the gases therein. By operating the combination of the embodiment of Figure 2, as described, the invention permits a simplified operation to obtain a dehydrated and deacetylized ethylene-containing gas in a simplified manner, as will be readily understood by those skilled in the art in possession of this disclosure.

TABLE I

*Material Balance—Mols per stream day*

| Column Number | 1 | 2 | 3 | 4 | 5 | 6 | 7 | 8 | 9 |
|---|---|---|---|---|---|---|---|---|---|
| Pipe Number | 1 | 6 | 10 | 14 | 22 | 27 | 9 | 7 | 8 |
| CO | 3,650 | | | | | | 3,650 | | 1 |
| $CO_2$ | 4,500 | 28 | 6 | 6 | | | 4,575 | 81 | 284 |
| $N_2$ | 44,150 | 3 | 3 | 3 | | | 44,153 | 6 | 21 |
| $H_2$ | 14,510 | | 1 | 1 | | | 14,510 | 1 | 4 |
| $CH_4$ | 4,410 | | 1 | 1 | | | 4,412 | 3 | 11 |
| $C_2H_2$ | 5,950 | 208 | 100 | 44 | 56 | | 7,455 | 1,605 | 5,842 |
| $C_2H_4$ | 1,659 | | 13 | 8 | 5 | | 1,656 | 10 | 37 |
| $C_3H_4$ | 119 | 3 | 2 | 1 | 1 | | 150 | 33 | 117 |
| $C_4H_2$ | 200 | 292 | 200 | 4 | 196 | | | | |
| $C_4H_4$ | 100 | 26 | 6 | 1 | 5 | | 121 | 27 | 94 |
| $H_2O$ | 5,920 | 1,050 | 5,920 | 231 | 517 | | | | |
| DMF | | 21,600 | 21,067 | | | 21,067 | 10 | 21,077 | 76,405 |
| Total | 85,168 | 23,210 | 27,319 | 300 | 780 | 21,067 | 80,692 | 22,843 | 82,816 |

The injection of solvent ahead of the refrigerator 41 in Figure 2 considerably reduces the freezing point of the resulting mixture, which when it contains equimolar proportions of dimethylformamide and water will have a freezing point as low as approximately −68° F. and will have a viscosity of only a few centipoises. Thus, dimethylformamide has been found to be ideally suited to drying operations for producing exceptionally low dew points or the quantitative removal of water from gases such as hydrocarbon gases or gases containing hydrocarbons.

When the embodiment of Figure 2 is employed, it will be noted that the enthalpy (refrigeration) requirement very closely approaches the minimum when the minimum is taken as only the latent heat of vaporization of water. Less refrigeration is required than with conventional bauxite drying.

The use of dimethylformamide at temperatures below 32° F. as in the embodiment according to Figure 2, results in several important advantages, one of which is, as noted, that an extremely low dew point is obtained so that the gas is sufficiently dry for subsequent treatment to remove acetylene, also at rather low temperatures, for example, as described and claimed in Serial Number 441,809, filed July 7, 1954, by the present inventor.

relatively low pressure compared with the pressures commonly employed when dehydrating gases by means of glycols.

The use of dimethylformamide according to this invention, to dehydrate hydrocarbon-containing gases, without substantially removing therefrom desirable hydrocarbons or even acetylene, is a noteworthy improvement.

The water content of the dimethylformamide which is removed from the foot of the water absorber will be sufficiently high to avoid absorbing acetylene and/or ethylene in substantial quantity but will be insufficient to prevent removal of water from the gas stream, thus resulting in the control which this invention sets forth can be exercised. Thus, it is clear that a hydrocarbon gas-rich dimethylformamide, as from an acetylene absorber, or substantially pure dimethylformamide, can be passed into the top of the dehydrator column to remove water from gases fed thereto, also containing acetylene and ethylene, yet by the time the solvent is removed as bottoms, its water content will have increased and it will contain only a very small or negligible proportion of feed gases other than water vapor.

Usually the dimethylformamide as fed to the dehydrator column will be substantially water-free although it can contain an appreciable concentration of water if the

TABLE II

*Material balance—Mols per stream day*

| Column Number | 1 | 2 | 3 | 4 | 5 | 6 | 7 |
|---|---|---|---|---|---|---|---|
| Pipe Number | 40 | 59 | 68 | 61 | 62 | 48 | 56 |
| Hydrogen | 33,557 | 33,557 | 33,544 | 13 | | | |
| Nitrogen | 3,654 | 3,654 | 3,646 | 8 | | | |
| Carbon Monoxide | 5,351 | 5,351 | 5,340 | 11 | | | |
| Methane | 16,899 | 16,899 | 16,795 | 104 | | | |
| Acetylene | 4,359 | 4,359 | 57 | 4,302 | | | |
| Ethylene | 521 | 521 | 520 | 1 | | | |
| Ethane | 65 | 65 | 65 | | | | |
| Carbon Dioxide | 1,162 | 1,162 | 1,021 | 141 | | | |
| Methyl Acetylene | 476 | 476 | 6 | 470 | | | |
| Propylene | 222 | 222 | 187 | 35 | | | |
| Water | 142 | | | | | 149 | 7 |
| DMF | | | | 43,003 | 43,003 | 142 | 142 |
| Total | 66,408 | 66,266 | 61,181 | 48,088 | 43,003 | 291 | 149 |

It is advantageous to directly remove as much water as can be removed conveniently prior to the dehydration step by such direct means as quenching and prechilling. This precaution minimizes the amount of heat of condensation of water to be removed in a less direct manner by the absorptive drying step. When prechilling is carried to a refrigeration temperature level, as in Figure 2, it is possible to dehydrate with a minimum of dimethylformamide solvent. As a result, in the embodiment of Figure 2, the ratio of water to dimethylformamide in the bottoms from absorber 43 is near one to one. As a consequence of both low solvent rate and water dilution, the amount of acetylene and other hydrocarbons dissolved in the absorber exit liquid is negligible.

Another advantage, it will be noted, is that the drying operation of the present invention can be conducted at a water content of the feed gas is relatively low. The water content of the solvent leaving the water absorber is preferably within the range 14 to 50 mole percent, although operation outside this range is not excluded. The dehydrator, according to this invention, can be operated at temperatures within the approximate range of −70 to 100° F., the low temperatures being presently preferred as evident from the advtantages of lower dew point, etc. as apparent from this disclosure. The pressure in the dehydrator zone usually will be atmospheric pressure or higher, preferably approximately the same pressure level as the acetylene absorption step.

The invention is particularly applicable to feed stocks which have been used in the examples of Figures 1 and 2 and these feed stocks preferably will be sulfur-free, that is, these gases will not contain hydrogen sulfide or other sulfur compounds.

Generally, with respect to the proportion of water which the dimethylformamide solvent can contain when it is introduced to the dehydrator, already containing some water, it will be apparent to one skilled in the art in possession of this disclosure that the said proportion will have to be such that additional water can be absorbed under the prevailing conditions and after absorption of said additional water sufficient to prevent absorbing and/or retaining absorbed an undesired proportion of hydrocarbon. Thus, it is clear that under the conditions of contact of the gas and the dimethylformamide solvent, the solvent should have an affinity for water.

An inherent advantage of this dehydration process is that the dehydrator tower may function as a heat exchanger, employing countercurrent direct contacting of vapor and liquid. In the example of Figure 1, the acetylene containing gas enters the dehydrator at 100° F. and leaves at −9° F. being chilled by exchange with the cold solvent. Still another inherent advantage evidenced in Fig. 1 is that the hydrocarbon fog associated with acetylene production tends to deposit out in the dehydrator tower as the gas stream is progressively chilled. A large amount of tars can thus deposit out, especially when the contacting is in a baffled section, without interfering with the operation. By contrast, it takes very little tars depositing on silica gel or bauxite drying beds to cause interference and even plugging of the bed as already noted.

Reasonable variation and modification are possible within the scope of the foregoing disclosure, drawing, and the appended claims to the invention, the essence of which is that dimethylformamide has been found to be excellently suitable for the dehydration of gases containing hydrocarbons, especially hydrocarbon gases containing acetylene and/or ethylene and that certain modus operandi based upon this contribution have been contributed also.

I claim:

1. A method for dehydrating a hydrocarbon gas containing acetylene which comprises contacting said gas with a dehydrating solvent consisting essentially of dimethylformamide, continuing the contacting of said gas with said dimethylformamide, and separating said dimethylformamide from said gas when it contains from about 14 to 50 mol percent of water at a temperature below 0° F.

2. A method for the dehydration of a gas containing hydrocarbons including acetylene and for the removal of acetylene from said gas which comprises contacting in a dehydration zone said gas with dimethylformamide solvent containing acetylene obtained as hereafter described in a proportion of said solvent to said gas such that said gas will be dehydrated under the conditions of contact, recovering from said zone a dehydrated gas, contacting said dehydrated gas with dimethylformamide in an acetylene absorption zone under conditions to absorb acetylene therefrom, thus obtaining said solvent containing acetylene and returning at least a portion of said solvent as said solvent containing acetylene to said dehydration zone.

3. A method according to claim 2 wherein the solvent containing water is removed from the dehydration zone, is stripped of water and passed to said acetylene absorption zone as at least a portion of the solvent employed therein.

4. A method for the removal of water from a hydrocarbon gas containing acetylene to dehydrate said gas which comprises contacting said gas with dimethylformamide, continuing the contacting of said gas with said dimethylformamide until the latter contains at least approximately 14 mol percent of water and then separating said dimethylformamide from said gas.

5. The dehydration of a gas containing acetylene which comprises contacting said gases with dimethylformamide in a proportion and under conditions such that it will contain before separation from said gases a quantity of water amounting to at least 14 mol percent of water at 0° F., stripping water from the dimethylformamide thus obtained and then employing said dimethylformamide to remove at least one component of said gas stream, which has been dehydrated, therefrom.

6. A method for dehydrating a gas containing acetylene, ethylene, and other gases which comprises admixing said gas with a substantial quantity of dimethylformamide containing water in a quantity sufficient to lower the freezing point of the mixture to a temperature below about 0° F., then chilling the mixture thus obtained to a temperature below 0° F., but above its freezing point, contacting said mixture with additional quantities of dimethylformamide in proportion and under conditions at said temperature such that said gas in said mixture will be substantially dehydrated, recovering a dehydrated gas and dimethylformamide containing from 14 to 50 mol percent water, heating said dimethylformamide to expel water therefrom, and returning the dehydrated dimethylformamide for reuse, passing the dehydrated gases obtained as above described into contact with additional quantities of dimethylformamide at a temperature below about 0° F., in the absence of water, to remove therefrom substantially all of the acetylene contained therein, and recovering the acetylene from said last mentioned dimethylformamide as a product of the process.

7. A method according to claim 6 wherein ethylene substantially free from acetylene is recovered as a product of the process.

8. A method for dehydrating a sulfur-free gas containing hydrocarbons which comprises contacting said gas with a minor proportion of dimethylformamide containing water in a proportion sufficient to render the hydrocarbon content of the gas substantially insoluble in said dimethylformamide except for an amount of the order of 0.37 mol percent but insufficient to prevent absorption of water from said gas under the conditions of contact.

9. A method for dehydrating a gas containing hydrocarbons which comprises contacting said gas with dimethylformamide containing acetylene under conditions so as to absorb water therefrom and to result in dimethylformamide containing water in a proportion sufficient to render the hydrocarbon content of the gas substantially insoluble in said dimethylformamide except for an amount of the order of 0.37 mol percent but insufficient to prevent absorption of water from said gas under the conditions of contact and then separating said dimethylformamide from said gas.

10. A method for dehydrating a hydrocarbon gas containing acetylene which comprises contacting said gas with a dimethylformamide dehydrating solvent containing acetylene, continuing the contacting of said dimethylformamide solvent with said gas until it contains from about 14 to 50 mol percent of water at a temperature below 0° F., and thereafter separating said resulting dimethylformamide solvent from said gas.

11. A method for the removal of water from a hydrocarbon gas containing acetylene to dehydrate said gas which comprises contacting said gas with dimethylformamide containing a minor proportion of acetylene, continuing the contacting of said gas with said dimethylformamide until said dimethylformamide contains at least approximately 14 mol percent of water and then separating said dimethylformamide from said gas.

12. A method for the removal of water from a hydrocarbon gas containing acetylene to dehydrate said gas which comprises contacting said gas with substantially anhydrous dimethylformamide containing a minor proportion of said gas, continuing the contacting of said gas with said dimethylformamide until said dimethylformamide contains at least 14 mol percent of water and then separating said dimethylformamide from said gas.

13. In a low-temperature solvent extraction process wherein a hydrocarbon gas which contains acetylene and moisture and which is at an elevated temperature is contacted with dimethylformamide solvent at a low temperature and then acetylene is separated and recovered from the dimethylformamide solvent having the acetylene absorbed therein, the improvement which comprises contacting the hydrocarbon gas containing acetylene before removal of said acetylene from said hydrocarbon gas with dimethylformamide solvent which contains acetylene and which was recovered from the acetylene absorption step to thereby remove the moisture from said gas and cool the said hydrocarbon gas containing acetylene which is to be contacted in the low-temperature solvent extraction process.

14. A method for dehydrating a hydrocarbon gas containing acetylene and water which comprises contacting said gas with a dimethylformamide dehydrating solvent containing from about 14 to 50 mol percent of water at a temperature below 0° F. and thereafter separating said solvent from said gas.

15. A method for dehydrating a gas containing hydrocarbons which comprises providing an absorbent consisting essentially of dimethylformamide and water by adjusting the amount of water in the dimethylformamide to be such that hydrocarbon will not dissolve therein to an extent greater than of the order of 0.37 mol percent and the quantity of water in the dimethylformamide to be less than that required to saturate the same and when the water content of the dimethylformamide has been so adjusted then contacting said gas containing hydrocarbons that also contains water with said dimethylformamide in which the water content has been adjusted as stated, and thereafter separating said dimethylformamide from said gas containing hydrocarbons and recovering said gas containing hydrocarbons in substantially dehydrated condition.

References Cited in the file of this patent
UNITED STATES PATENTS 2,714,940     Milligan _____ Aug. 9, 1955

OTHER REFERENCES

"Dimethyl Formamide Product Information," Grasselli Chemicals Department, Du Pont Co., page 1 thereof.